United States Patent
Zhang

(10) Patent No.: US 12,045,146 B2
(45) Date of Patent: Jul. 23, 2024

(54) LOG ACQUISITION METHOD AND APPARATUS, TERMINAL, SERVER, AND COMPUTER READABLE STORAGE MEDIUM

(71) Applicant: XI'AN ZHONGXING NEW SOFTWARE CO., LTD., Xi'an (CN)

(72) Inventor: Zhen Zhang, Shenzhen (CN)

(73) Assignee: XI'AN ZHONGXING NEW SOFTWARE CO., LTD., Xi'an (CN)

( * ) Notice: Subject to any disclaimer, the term of this patent is extended or adjusted under 35 U.S.C. 154(b) by 62 days.

(21) Appl. No.: 17/905,786

(22) PCT Filed: Feb. 18, 2021

(86) PCT No.: PCT/CN2021/076766
§ 371 (c)(1),
(2) Date: Sep. 7, 2022

(87) PCT Pub. No.: WO2021/227588
PCT Pub. Date: Nov. 18, 2021

(65) Prior Publication Data
US 2023/0114166 A1     Apr. 13, 2023

(30) Foreign Application Priority Data

May 14, 2020   (CN) .......................... 202010407845.8

(51) Int. Cl.
*G06F 11/16*     (2006.01)
*H04L 41/069*    (2022.01)

(52) U.S. Cl.
CPC ............ *G06F 11/16* (2013.01); *H04L 41/069* (2013.01)

(58) Field of Classification Search
None
See application file for complete search history.

(56) References Cited

U.S. PATENT DOCUMENTS

| 7,308,487 B1 * | 12/2007 | Dansie ............... H04N 21/4424 705/40 |
| 2015/0186245 A1 * | 7/2015 | Hoen, IV ............ G06F 11/3476 714/45 |
| 2015/0302694 A1 | 10/2015 | Acres et al. |
| 2016/0171539 A1 * | 6/2016 | Ganduri ............ G06Q 30/0255 705/14.53 |

FOREIGN PATENT DOCUMENTS

CN    110912998 A    3/2020

OTHER PUBLICATIONS

International Searching Authority. International Search Report and Written Opinion for PCT Application No. PCT/CN2021/076766 and English translation, mailed May 25, 2021, pp. 1-9.

* cited by examiner

*Primary Examiner* — Craig C Dorais
(74) *Attorney, Agent, or Firm* — Vivacqua Crane, PLLC

(57) ABSTRACT

A log acquisition method and device, a terminal device, a server and a computer readable storage medium are disclosed. The log acquisition method, which is applicable to the terminal device, includes: receiving a log acquisition instruction sent by the server (S101); establishing a data stream path with the server in response to the log acquisition instruction (S103); collecting real-time log data of the terminal device, and sending the real-time log data to the server through the data stream path (S104).

13 Claims, 4 Drawing Sheets

| header tag | controlLen | controlField | dataLen | dataField | tail tag |

LOG ACQUISITION METHOD AND APPARATUS, TERMINAL, SERVER, AND COMPUTER READABLE STORAGE MEDIUM

CROSS-REFERENCE TO RELATED APPLICATIONS

This application is a national stage filing under 35 U.S.C. § 371 of international application number PCT/CN2021/076766, filed Feb. 18, 2021, which claims priority to Chinese patent application No. 202010407845.8 filed May 14, 2020. The contents of these applications are incorporated herein by reference in their entirety.

TECHNICAL FIELD

Embodiments of the present disclosure relate to the technical field of communications, and in particular, to a log acquisition method and apparatus, a terminal device, a server and a computer readable storage medium.

BACKGROUND

With the development of 5G technology, various 5G network application scenarios have emerged, such as cloud VR/AR, Internet of Vehicles, wireless medical, connected drones, smart cities, intelligent manufacturing, personal AI assistance and the like, so that Internet of Things devices and Mobile Broadband (MBB) terminal devices can be applied in all walks of life, and can be arranged in various environments, such as barren desert, dense forests and other places that are not easily accessible or inaccessible to human beings. In addition, in order to obtain an operating state of a terminal device or diagnose an operating fault of a terminal device, it is necessary to acquire log data of the terminal device.

In some cases, there are at least the following problems: in some methods for diagnosing a terminal device, it is necessary to connect with the terminal device at a short distance to export operating log data inside the device, and it is impossible to acquire the operating log data of the terminal device remotely, which causes some troubles for the terminal device diagnosis in the current 5G era.

SUMMARY

In view of the above, an embodiment of the present disclosure provides a log acquisition method, applicable to a terminal device. The log acquisition method includes: receiving a log acquisition instruction sent by a server; establishing a data stream path with the server in response to the log acquisition instruction; and collecting real-time log data of the terminal device, and sending the real-time log data to the server through the data stream path.

An embodiment of the present disclosure further provides a log acquisition method, applicable to a server. The log acquisition method includes: sending a log acquisition instruction to a terminal device; establishing a data stream path with the terminal device in response to a data stream path establishment request initiated by the terminal device based on the log acquisition instruction; and receiving real-time log data sent by the terminal device through the data stream path.

An embodiment of the present disclosure further provides a log acquisition apparatus. The log acquisition apparatus is built in a terminal device, and includes: a master control communication module configured to receive a log acquisition instruction sent by a server, and establish a data stream path with the server in response to the log acquisition instruction; and a log acquisition module configured to collect real-time log data of the terminal device, and send the real-time log data to the server through the data stream path.

An embodiment of the present disclosure further provides a terminal device. The terminal device includes: at least one processor; and a memory communicatively connected to the at least one processor, where the memory stores instructions executable by the at least one processor which, when executed by the at least one processor, cause the at least one processor to perform the log acquisition method applicable to the terminal device.

An embodiment of the present disclosure further provides a server. The server includes: at least one processor; and a memory communicatively connected to the at least one processor, where the memory stores instructions executable by at least one processor which, when executed by the at least one processor, cause the at least one processor to perform the log acquisition method applicable to the server.

An embodiment of the present disclosure further provides a computer readable storage medium storing a computer program which, when executed by a processor, causes the processor to implement the log acquisition method described above.

BRIEF DESCRIPTION OF DRAWINGS

One or more embodiments are illustrated by corresponding figures in the accompanying drawings, and these illustrations do not constitute a limitation on the embodiments, and elements with the same reference numerals in the accompanying drawings refer to similar elements. Unless otherwise stated, the figures in the accompanying drawings are not necessarily drawn to scale.

DETAILED DESCRIPTION

Figure 1:
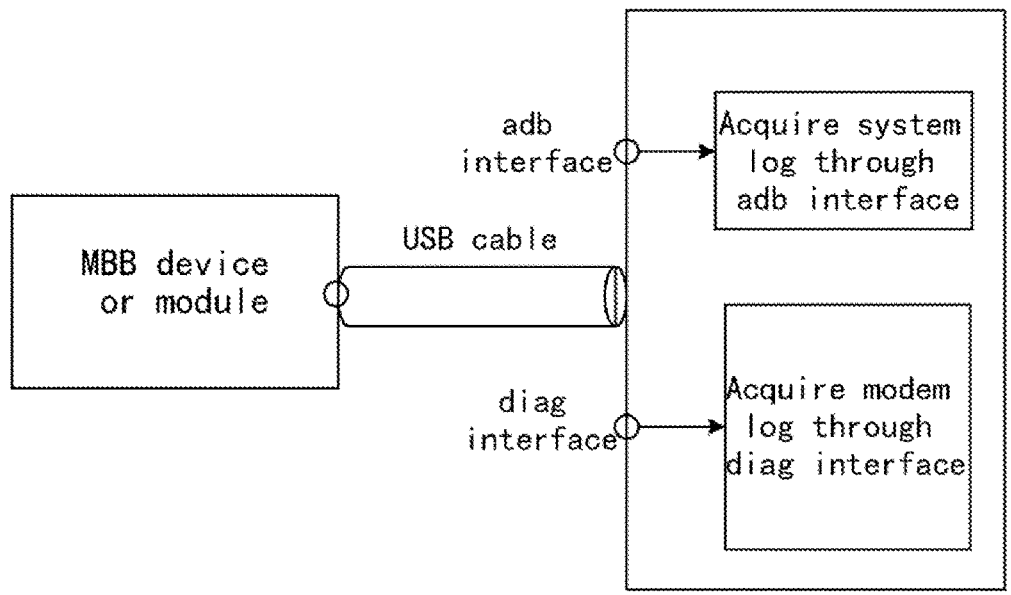
FIG. 1 is a schematic diagram of the principle of acquiring terminal device log data in some cases.

FIG. 1 is a schematic diagram of acquiring operating log data of an MBB terminal device or module in some cases. Referring to FIG. 1, in some cases, in order to acquire the log data of the MBB terminal device or module, there is a need to connect with the MBB terminal device or module through a USB cable at a short distance, to export system log data from an adb interface on the terminal device through the USB cable, or export modem log data from a diag interface on the terminal device, where the adb interface refers to an Android usb interface, and the diag interface refers to a modem diagnosis interface. That is, in some cases, in order to acquire the operating log data of the MBB terminal device, an engineer needs to go to the site where the MBB terminal device is located, which brings great inconvenience to the operating diagnosis of the MBB device.

In view of the above, an embodiment of the present disclosure provides a log acquisition method. The method includes: receiving a log acquisition instruction sent by a server; establishing a data stream path with the server in response to the log acquisition instruction; collecting real-time log data of a terminal device and send the real-time log data to the server through the data stream path, so that the log data of the terminal device can be remotely acquired, which brings great convenience for diagnosis of operating log data of the terminal device acquired by a user.

In order to make the objects, technical schemes and advantages of the embodiments of the present disclosure clearer, the embodiments of the present disclosure will be described in detail below with reference to the accompanying drawings. However, those having ordinary skills in the art can understand that in various embodiments of the present disclosure, many technical details are put forward in order to make the readers better understand the present disclosure. However, the technical schemes claimed by the present disclosure can still be realized without these technical details and various changes and modifications based on the following embodiments.

A first embodiment of the present disclosure relates to a log acquisition method, which is applicable to a terminal device.

Figure 2:
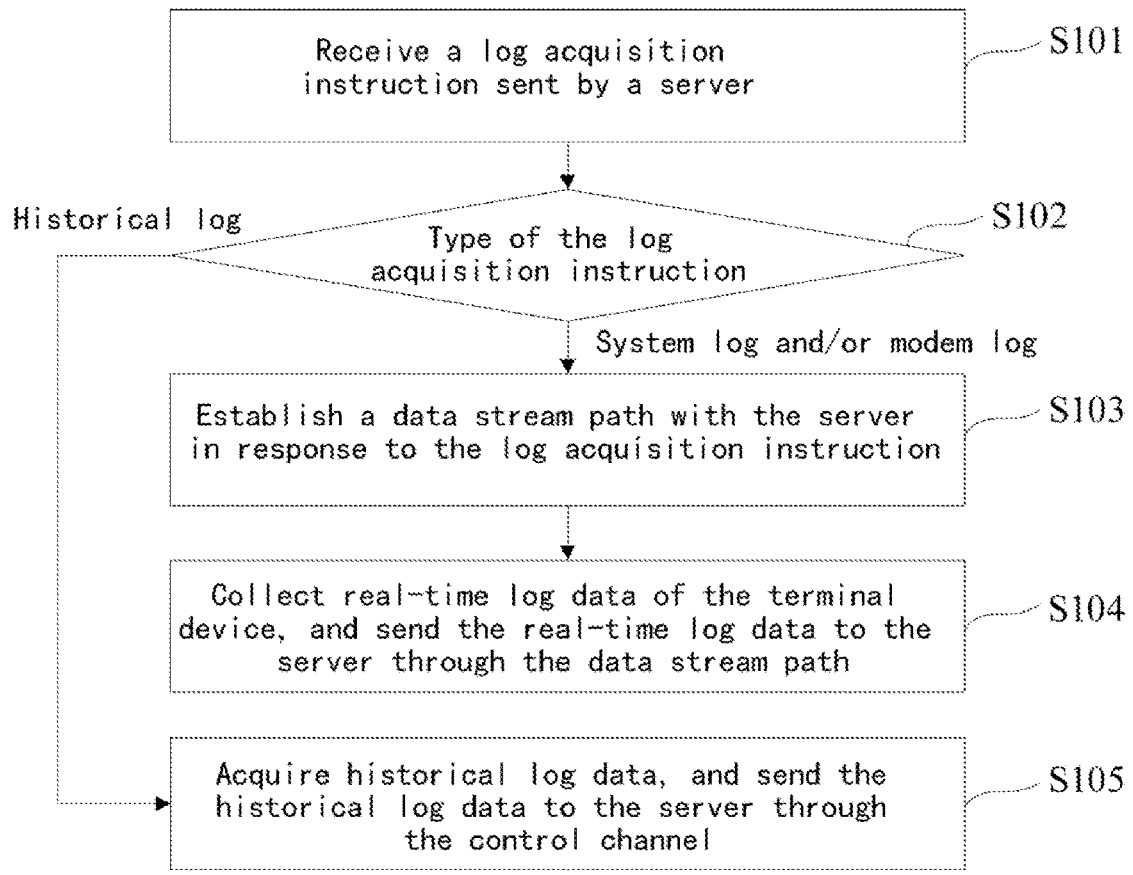
FIG. 2 is a flowchart of a log acquisition method provided by a first embodiment of the present disclosure.

FIG. 2 is a flowchart of a log acquisition method according to this embodiment. The log acquisition method according to this embodiment will be described in detail below with reference to the accompanying drawings.

The terminal device may be a mobile phone, mobile WI-FI, tablet computer, laptop computer, on-board computer, drone, on-board Telematics BOX (TBOX), telemedicine equipment or Vehicle to X (V2X) and other electronic devices.

When a user needs to acquire log data of the terminal device, the user may send a log acquisition instruction to the terminal device through a server, and utilize the server to acquire the log data from the terminal device, to realize remote diagnose of a state of the terminal device. For example, when the terminal device is a mobile phone, mobile WI-FI or other devices, the user can diagnose a current network rate, registered cell state, bit error rate or signal strength of the terminal device. For example, when the terminal device is an on-board TBOX, telemedicine equipment or V2X application, the user can also diagnose application functions on the terminal device.

At S101, a log acquisition instruction sent by a server is received.

In an embodiment, prior to S101, the method may further include: establishing a control channel with the server based on a Transmission Control Protocol (TCP).

In an embodiment, by acquiring an IP address and port information of the server, the terminal device establishes a TCP-based control channel with the server, and receives the log acquisition instruction sent by the server through the control channel.

In other embodiments, the control channel may be established between the terminal device and the server in other ways. It should be noted that the example of establishing a control channel with the server based on the TCP does not involve the core content of the present disclosure and does not constitute a limitation on the present disclosure.

Figures 3, 4:
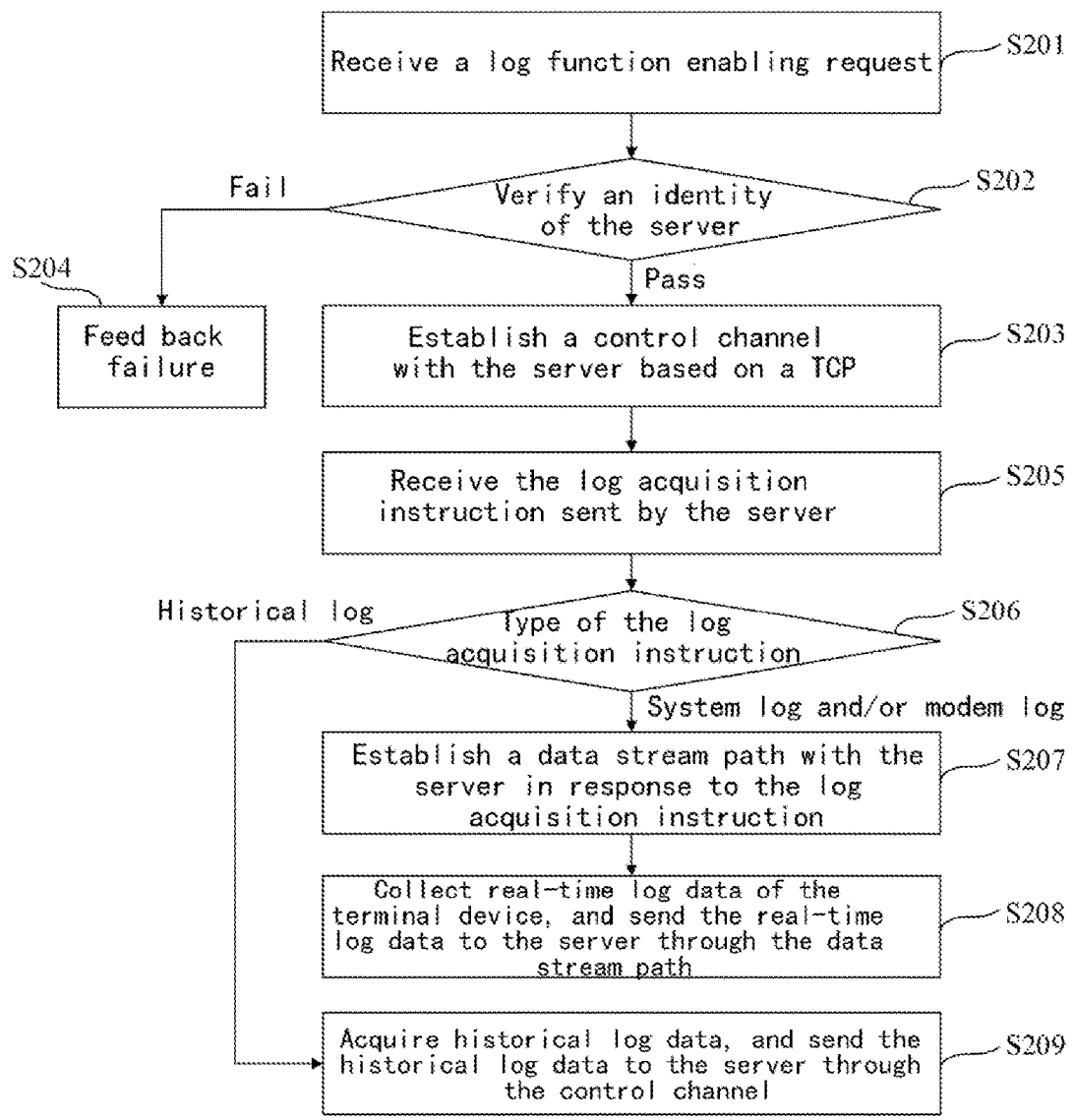
FIG. 3 is a schematic diagram of a message format structure in a log acquisition method provided by a first embodiment of the present disclosure.
FIG. 4 is a flowchart of a log acquisition method provided by a second embodiment of the present disclosure.

In an embodiment, the terminal device and the server may use a private JSON format message for communication, and use different message identifications (msgids) to control and acquire different log functions. The private JSON format message includes: header tag, control field length (controlLen), control field (controlField), data field length (dataLen), data field (dataField) and tail tag, as shown in FIG. 3.

The header tag is used to indicate the beginning of the message and occupies 2 bytes. For example, the start tag is 0x23 0x7E, that is, "#~". The controlLen is of int32 type, used to indicate the length of the following control field, which occupies four bytes and stores length data in big-endian network byte order. The controlField is used to fill control data and JSON data to define control messages. The dataLen is of int32 type, used to indicate the length of the following data field dataField, which occupies four bytes and stores length data in big-endian network byte order. The dataField is used to indicate actually filled data, such as profile compressed package data, historical log compressed package data. The tail tag is used to indicate the end of the message and occupies 2 bytes. The end tag is 0x7E 0x23, that is, "~#". When there is no data field, the length of the data field is filled with 0, followed by the tail tag.

In an embodiment, the log acquisition instruction may include a system log acquisition instruction, a modem log acquisition instruction and a historical log acquisition instruction. After S101, S102 may be performed. At S102, a type of the log acquisition instruction is identified. If a log acquisition instruction identification result includes a system log acquisition instruction or a modem log acquisition instruction, S103 is performed. At S103, a data stream path with the server is established in respond to the log acquisition instruction. If the log acquisition instruction includes a historical log acquisition instruction, S105 is performed. At S105, historical log data is acquired and sent to the server through the control channel. Acquiring the historical log data may help to diagnose and analyze the historical operating state of the terminal device. Combined with the historical log data of the terminal device, it is beneficial to further analyze an operating state or a cause of an operation failure of the terminal device.

It should be noted that acquisition of historical logs is not necessary in this embodiment. In other embodiments, the log acquisition instruction may only include a system log acquisition instruction or a modem log acquisition instruction.

At S103, a data stream path with the server is established in response to the log acquisition instruction.

In an embodiment, after receiving the system log acquisition instruction and/or the modem log acquisition instruction sent by the server, a data stream path with the server is established through an IP address and port information of the server.

In an embodiment, establishing a data stream path with the server may include: establishing a data stream path based on a Socket mechanism. In this way, the log data transmitted in the data stream path can be encrypted, to ensure data security, and prevent leakage of log data of a user. It should be noted that how to establish a data stream path with the server based on the socket mechanism is a well-known technology, which will not be described in detail here.

At S104, real-time log data of the terminal device is collected and sent to the server through the data stream path.

The log acquisition instruction includes a system log acquisition instruction and/or a modem log acquisition instruction. If the log acquisition instruction includes the system log acquisition instruction, the real-time log data includes real-time system log data; and if the log acquisition instruction includes the modem log acquisition instruction, the real-time log data includes real-time modem log data.

When the received log acquisition instruction sent by the server includes the system log acquisition instruction, the terminal device collects its own real-time system log data and sends the real-time system log data to the server by means of a socket. When the log acquisition instruction sent by the server includes the modem log acquisition instruction, the terminal device collects its own real-time modem log data and sends the real-time modem log data to the server by means of a socket.

The system log data includes a function operating state and diagnosis information of a device application layer. The modem log data includes a network-related function operating state and diagnosis information of a device chip manufacturer.

In an embodiment, after the terminal device receives the system log acquisition instruction and/or the modem log acquisition instruction of a msgid6 message type from the control channel, a data stream path is established through a socket mechanism to transmit a real-time log data stream. After the terminal device receives an Acknowledgement (ACK) message that the data stream path is successfully established sent by the server, system log data or modem log data of the terminal device is collected in real time, and the real-time system log data or modem log data is sent to the server in real time through the data stream path. After the data stream path is successfully established, the terminal device also sends a unique identifier to the server through the data stream path, and the server identifies a terminal device to which the data transmitted through the current data stream path belongs according to the unique identifier, where the unique identifier may include International Mobile Equipment Identity (IMEI), Serial Number (SN), device name and log type.

The real-time modem log data of the terminal device is exported through the data stream path, so that the modem log data of the terminal device can be acquired actively, and there is no need to connect an export tool on a PC side to acquire the modem log data of the terminal device, so that the modem log data of the terminal device can be acquired more conveniently, and then the operating state of the terminal device can be diagnosed through the modem log data.

At S105, historical log data is acquired and sent to the server through the control channel.

In an embodiment, the terminal device has a local storage unit configured to store historical log data of the terminal device. The historical log data includes: system log (syslog), display message (dmesg), firewall state, CPU operating efficiency, battery service life and other device information. When the log acquisition instruction includes a historical log acquisition instruction, the terminal device sends the historical log data stored in the local storage unit to the server through the control channel. For example, the historical log data is filled in a data field of a JSON format message after being packaged and collected, and then sent to the server by means of a msgid2 message type.

In addition, after the terminal device receives a system log closing instruction and/or a modem log closing instruction of the msgid6 message type from the control channel, the established data stream path is closed, and the real-time collection of system logs and the modem logs is stopped.

According to the log acquisition method provided by the embodiment of the present disclosure, real-time operating log data of a terminal device can be acquired remotely by establishing a data stream path between the terminal device and a server, which avoids the disadvantage that the terminal device must be connected by a user at a short distance to export log data in some cases, and provides great convenience for the user to acquire the operating log data of the terminal device remotely for diagnosis. For ordinary users, they can remotely check the operating state of the terminal device, and for operators, they do not need to send staff to the device site for diagnosis, thus reducing labor costs of the operators.

A second embodiment of the present disclosure provides a log acquisition method. The second embodiment is substantially the same as the first embodiment, except that prior to receiving the log acquisition instruction sent by the server, the method further includes: receiving a log function enabling request sent by the server, and establishing a control channel with the server based on a TCP. Receiving the log acquisition instruction sent by the server includes receiving the log acquisition instruction through the control channel.

Figure 5:
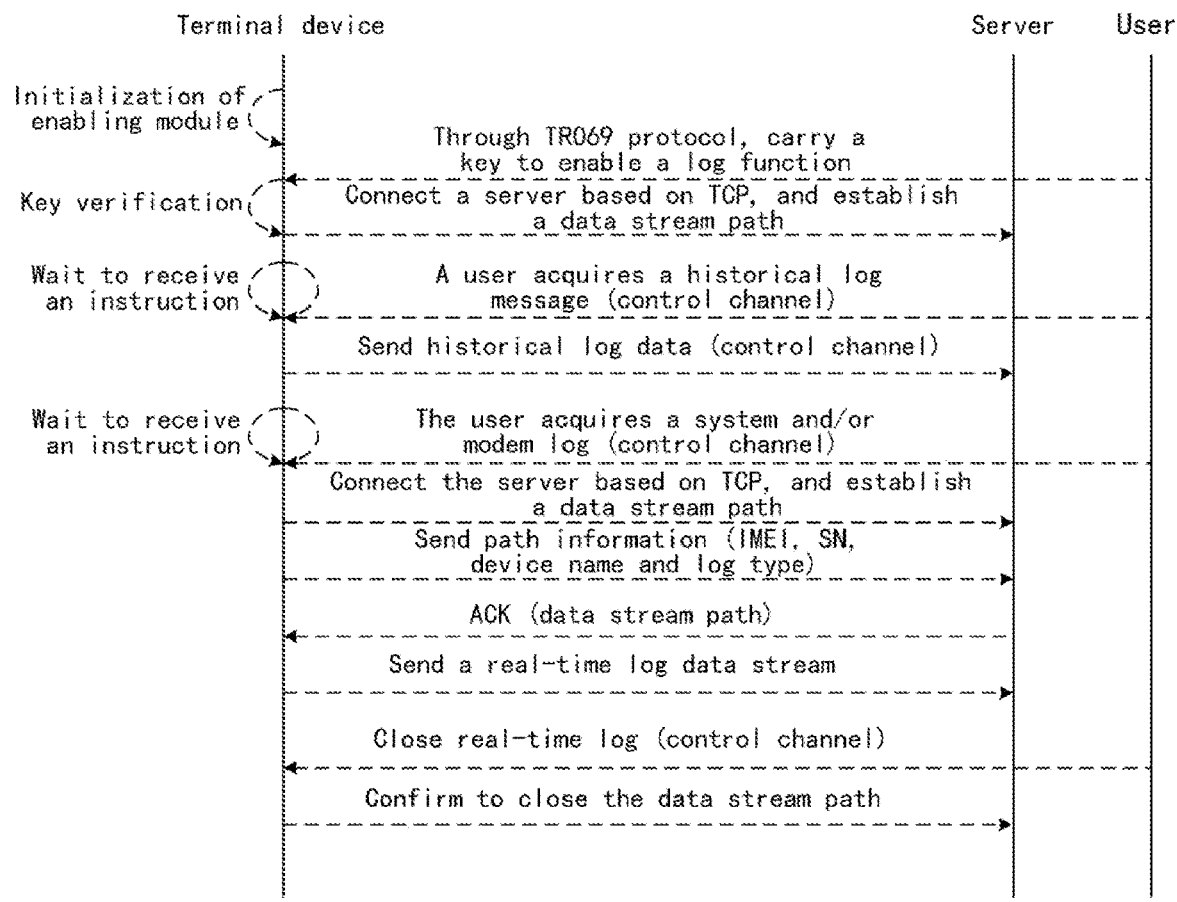
FIG. 5 is a schematic diagram showing interaction in a log acquisition method provided by a second embodiment of the present disclosure.

FIG. 4 is a flowchart of a log acquisition method provided by this embodiment, and FIG. 5 is a schematic diagram showing interaction in a log acquisition method provided by this embodiment. The log acquisition method provided by this embodiment will be described in detail below in conjunction with the accompanying drawings. For the same or similar technical details, reference may be made to the specific description in the previous embodiment, which will not be repeated here.

At S201, a log function enabling request is received.

In an embodiment, the server may send a log function enabling request to the terminal device through a TR069 protocol after inquiring and obtaining an IMEI number of the terminal device. The log function enabling request carries an IP address and port information of the server. S203 may be directly performed after S201, or S203 may be performed after S202.

At S202, an identity of the server is verified, and if the verification passes, S203 will be performed in which a control channel with the server is established based on a TCP; and if the verification fails, S204 will be performed, and a failure is fed back.

In an embodiment, the log function enabling request may carry a key. Prior to establishing a control channel with the server based on a TCP, the method further includes: verifying that an identity of the server is legal based on the key.

In an embodiment, after the terminal device receives the log function enabling request, the identity of the server is verified based on the key. If the key verification passes, the identity of the server is legal, and S203 will be performed in which a control channel with the server is established. If the key verification fails, the identity of the server is illegal, and a message indicating that the key is incorrect and the identity verification fails is fed back to the server.

Prior to establishing a control channel with the server, verifying the legality of the identity of the server can avoid illegal acquisition of the log data of the terminal device and ensure the security of the log data of the terminal device.

At S203, a control channel with the server is established based on a TCP.

After the identity verification of the server passes, a TCP-based control channel is established with the server based on an IP address and port information in the log function enabling request.

At S205, a log acquisition instruction sent by the server is received.

At S206, a type of the log acquisition instruction is identified, and if the log acquisition instruction is a system log acquisition instruction and/or a modem log acquisition instruction, S207 is performed in which a data stream path with the server is established in response to the log acquisition instruction; and if the log acquisition instruction is a historical log acquisition instruction, S209 is performed in which historical log data is acquired and sent to the server through the control channel.

At S207, a data stream path with the server is established in response to the log acquisition instruction.

At S208, real-time log data of the terminal device is collected and sent to the server through the data stream path.

At S209, historical log data is acquired and sent to the server through the control channel.

It should be noted that steps S205, S206, S207, S208, and S209 are identical to steps S101, S102, S103, S04, and S105 in the previous embodiment. Reference may be made to the description in the previous embodiment for details, which will not be repeated here.

Compared with the previous embodiment, this embodiment has the advantages that a log data acquisition function is enabled only when necessary, so that the terminal device is prevented from being in the operating state of acquiring logs all the time, and unnecessary power consumption is avoided. In addition, the legality of the identity of the server is verified, so that the illegal acquisition of the log data of the terminal device can be avoided, and the security of the log data of the terminal device can be ensured.

A third embodiment of the present disclosure relates to a log acquisition method, applicable to a server. The log acquisition method includes: sending a log acquisition instruction to a terminal device; establishing a data stream path with the terminal device in response to a data stream path connection request initiated by the terminal device based on the log acquisition instruction; and receiving real-time log data sent by the terminal device through the data stream path.

Figure 6:
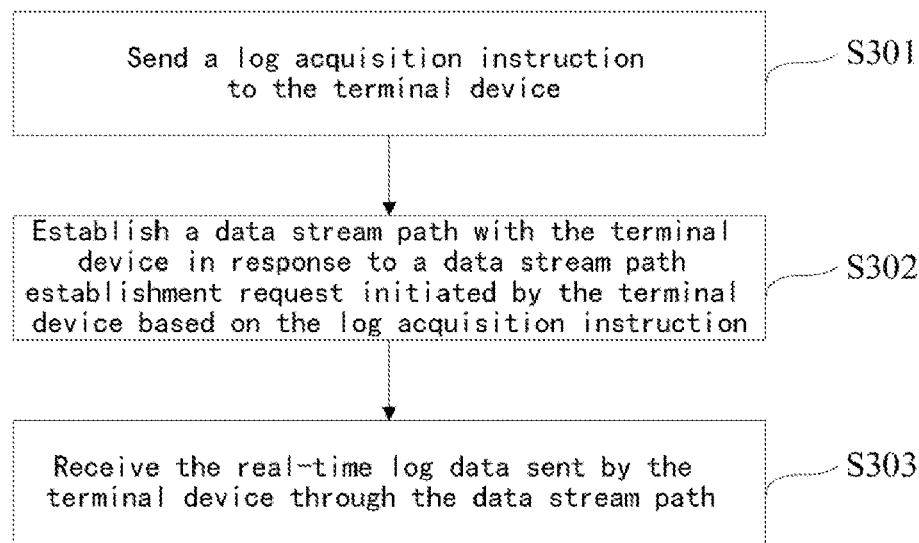
FIG. 6 is a flowchart of a log acquisition method provided by a third embodiment of the present disclosure.

FIG. 6 is a flowchart of a log acquisition method provided by this embodiment. The log acquisition method provided by this embodiment will be described in detail below in conjunction with the accompanying drawings. For the same or similar technical details, reference may be made to the specific description in the previous embodiment, which will not be repeated here. It should be noted that in this embodiment, the server may be an Auto-Configuration Server (ACS).

At S301, a log acquisition instruction is sent to the terminal device.

Prior to step S301, the log acquisition method may further include: sending a log function enabling request to the terminal device. A log acquisition function of the terminal device is enabled by sending the log function enabling request to the terminal device, so that the log data acquisition function of the terminal device can be enabled only when necessary, thus preventing the terminal device from being in an operating state of acquiring logs all the time and avoiding unnecessary power consumption.

In addition, the log function enabling request may further include a key for the terminal device to verify the identity of the server, to establish a control channel with the terminal device after receiving acknowledgement information fed back by the terminal device. The acknowledgement information is sent by the terminal device after verifying that the identity of the server is legal based on the key. Sending a log acquisition instruction to the terminal device includes: sending the log acquisition instruction to the terminal device through the control channel.

Prior to establishing the control channel, sending the key to the terminal device for the terminal device to verify the legality of the server can avoid the illegal acquisition of the log data of the terminal device and ensure the security of the log data of the terminal device.

At S302, a data stream path with the terminal device is established in response to a data stream path establishment request initiated by the terminal device based on the log acquisition instruction.

At S303, real-time log data sent by the terminal device is received through the data stream path.

The log acquisition instruction may include a system log acquisition instruction, a modem log acquisition instruction and/or a historical log acquisition instruction. If the log acquisition instruction sent to the terminal device includes a system log acquisition instruction and/or a modem log acquisition instruction, real-time log data corresponding to the log acquisition instruction sent by the terminal device is received through the data stream path. If the log acquisition instruction sent to the terminal device includes a historical log acquisition instruction, historical log data sent by the terminal device is received through the control channel.

The server saves the received system log data stream and modem log data stream in corresponding files in real time, and saves the historical log data extracted from the data field in a corresponding file for users to read the log data in the file.

It is not difficult to find that this embodiment is a server embodiment corresponding to the above terminal device embodiment, and this embodiment can be implemented in cooperation with the above terminal device embodiment. The corresponding technical details mentioned in the above terminal device embodiment is still valid in this embodiment, which will not be repeated here to avoid repetition. Accordingly, the corresponding technical details mentioned in this embodiment can also be applied to the above terminal device embodiment.

According to log acquisition method provided by the embodiment of the present disclosure, real-time operating log data of a terminal device can be acquired remotely by establishing a data stream path between a terminal device and a server, which avoids the disadvantage that the terminal device must be connected by a user at a short distance to export the log data in some cases, and provides great convenience for the user to acquire the operating log data of the terminal device remotely for diagnosis. For ordinary users, they can remotely check the operating state of the device, and for operators, they do not need to send staff to the device site for diagnosis, thus reducing labor costs of the operators.

The steps of the above methods are divided only for clarity of description, and may be combined into one step or some steps can be split into multiple steps during implementation, so long as the same logical relationship is included, which all fall within the scope of protection of the present disclosure. Insignificant modifications or designs made or introduced to the algorithms or processes without changing the core designs thereof should fall within the scope of protection of the present disclosure.

Figure 7:
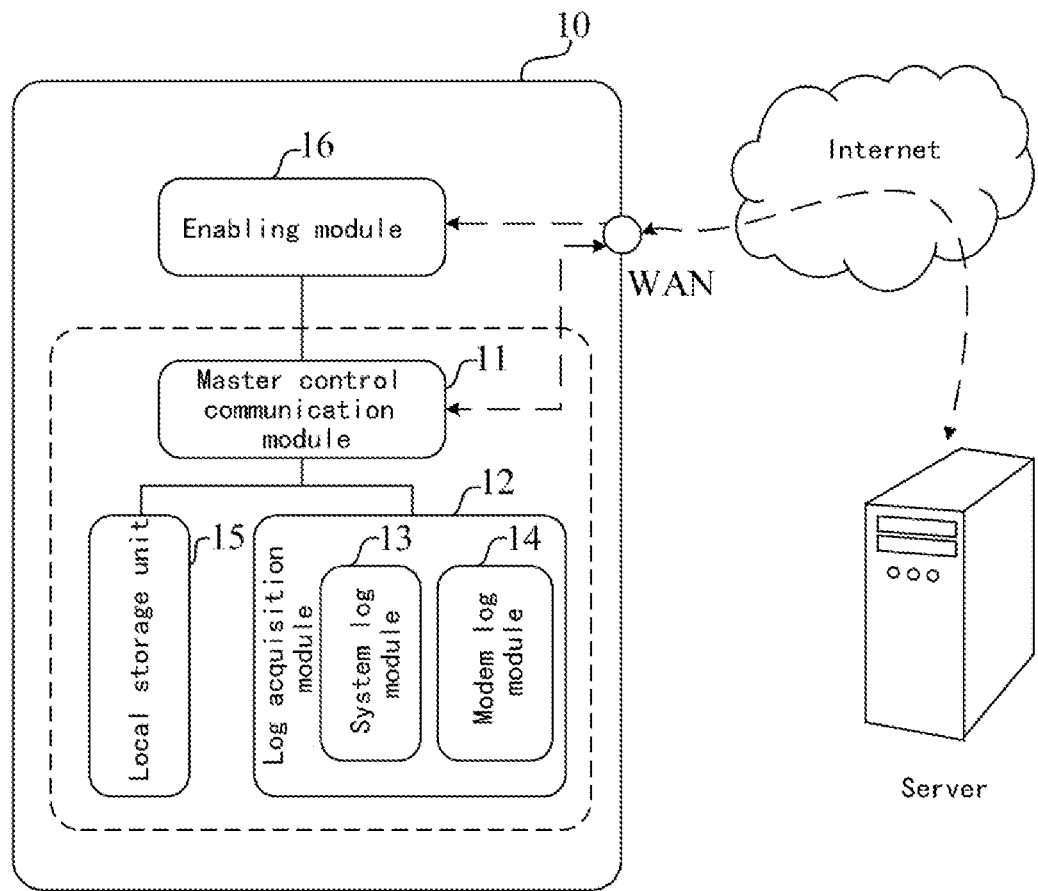
FIG. 7 is a schematic structural diagram of a log acquisition apparatus provided by a fourth embodiment of the present disclosure.

A fourth embodiment of the present disclosure provides a log acquisition apparatus. Referring to FIG. 7, the log acquisition apparatus is built in a terminal device 10. The log acquisition apparatus includes: a master control communication module 11 configured to receive a log acquisition instruction sent by a server, and establish a data stream path with the server in response to the log acquisition instruction; and a log acquisition module 12 configured to acquire real-time log data of the terminal device, and send the real-time log data to the server through the data stream path.

FIG. 7 is a schematic structural diagram of a log acquisition apparatus provided by this embodiment. The log acquisition apparatus provided by this embodiment will be described in detail below in conjunction with the accompanying drawings. For the same or similar technical details, reference may be made to the specific description in the above embodiment, which will not be repeated here.

It should be noted that the log acquisition module 12 may include a system log module 13 and a modem log module 14. The system log acquisition module 13 is configured to collect real-time system log data of the terminal device when the log acquisition instruction includes a system log acquisition instruction, and send the real-time system log data to the server through the data stream path. The modem log module 14 is configured to collect real-time modem log data of the terminal device when the log acquisition instruction includes a modem log acquisition instruction, and send the real-time modem log data to the server through the data stream path.

It should be noted that the log acquisition apparatus may further include a local storage unit 15 configured to store historical log data of the terminal device. The master control module 11 is further configured to acquire historical log data from the local storage unit 15 when the log acquisition instruction includes a historical log acquisition instruction, and send the historical log data to the server through the control channel.

In addition, the log acquisition apparatus may further include an enabling module 16 configured to receive a log function enabling request sent by the server. The log function enabling request contains a key, and the legality of an identity of the server is verified based on the key. The enabling module 16 is further configured to notify the master communication module 11 to establish a control channel with the server after an identity verification result of the server is legal.

It should be noted that the enabling module 16 may be a TR069 module, and the server may be a TR069 ACS server. In this embodiment, for the consideration of terminal device information security, the log acquisition module 12 and the master control communication module 11 are normally closed and inactive. Only when the user needs to acquire the log data of the terminal device, the terminal device is reversely controlled through the TR069 protocol. The TR069 module enables the master control communication module 11 and the log acquisition module 12, and informs the master control communication module 11 of the IP address and port information of the server for the master communication module to establish a connection with the server.

The terminal device 10 has a WAN interface, and may be connected to the Internet through a modem, a wireless network WI-FI or an rj45 network cable on the WAN interface, and then connected to the server through the Internet.

It should be noted that the master control communication module 11, the log acquisition module 12, and the local storage unit 15 in this embodiment may be integrated into a log management module.

It is not difficult to find that this embodiment is a device embodiment corresponding to the first and second embodiments, and this embodiment can be implemented in cooperation with the first and second embodiments. The corresponding technical details mentioned in the first and second embodiments are still valid in this embodiment, which will not be repeated here to avoid repetition. Accordingly, the corresponding technical details mentioned in this embodiment may also be applied to the first and second embodiments.

Figure 8:
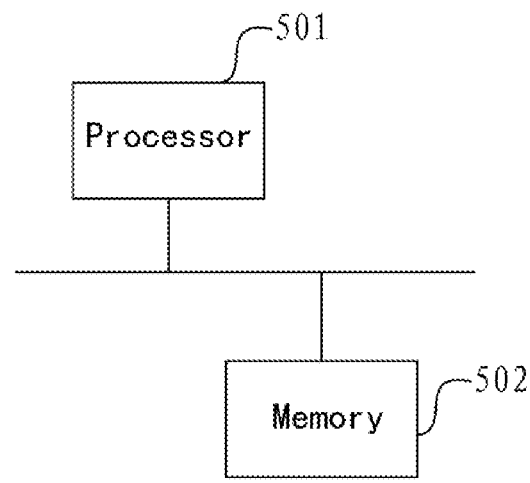
FIG. 8 is a schematic structural diagram of a terminal device provided by a fifth embodiment of the present disclosure.

A fifth embodiment of the present disclosure provides a terminal device. As shown in FIG. 8, the terminal device includes: at least one processor 501; and a memory 502 communicatively connected to at least one processor 501, where the memory 502 stores instructions executable by the at least one processor 501 which, when executed by the at least one processor 501, cause the at least one processor 501 to perform the log acquisition method applicable to the terminal device.

A six embodiment of the present disclosure further provides a server. FIG. 8 shows a schematic structural diagram of a server provided by this embodiment. As shown in FIG. 8, the server may include at least one processor 501; and a memory 502 communicatively connected to the at least one processor 501, where the memory 502 stores instructions executable by at least one processor 501 which, when executed by the at least one processor 501, cause the at least one processor 501 to perform the log acquisition method applicable to the server.

The connection mode of the processor and the memory in the terminal device is similar to the connection mode of the processor and the memory in the server, and the details are as follows.

The memory 502 and the processor 501 are connected by a bus which may include any number of interconnected buses and bridges. The bus connects various circuits of one or more processors 501 and the memory 502 together. The bus may also connect various other circuits, such as peripherals, voltage regulators, and power management circuits, which are well known in the art and therefore will not be described further herein. A bus interface provides an interface between the bus and a transceiver. The transceiver may be a single element or multiple elements, such as multiple receivers and transmitters, providing a unit for communicating with various other devices over a transmission medium. Data processed by the processor 501 is transmitted on the wireless medium through an antenna. Furthermore, the antenna also receives the data and transmits the data to the processor 501.

The processor 501 is configured for managing the bus and performing general processing, and can also provide various functions, including timing, peripheral interfacing, voltage regulation, power management and other control functions. The memory 502 may be configured to store data used by the processor 501 when performing operations.

An embodiment of the present disclosure further provides a computer readable storage medium storing a computer program which, when executed by a processor, causes the processor to implement the log acquisition method applicable to the terminal device or the log data acquisition method applicable to the server.

That is, it can be understood by those having ordinary skills in the art that all or part of the steps in the method for implementing the above embodiments can be completed by instructing related hardware through a program, which is stored in a storage medium and includes several instructions to cause a device (such as a single-chip microcomputer, a chip, etc.) or a processor to perform all or part of the steps of the method according to various embodiments of the present disclosure. The aforementioned storage medium includes: a USB flash disk, a mobile hard disk, a Read-Only Memory (ROM), a Random Access Memory (RAM), a magnetic disk or an optical disk and other media that can store program codes.

Embodiments of the present disclosure provide a log acquisition method and apparatus, a terminal device, a server and a computer readable storage medium, so that log data of the terminal device can be remotely acquired. According to the embodiments of the present disclosure, real-time operating log data of a terminal device can be acquired remotely by establishing a data stream path between the terminal device and the server, which avoids the disadvantage that the terminal device must be connected by a user at a short distance to export the log data in some cases, and provides great convenience for the user to acquire the operating log data of the terminal device remotely for diagnosis. For ordinary users, they can remotely check the operating state of the device, and for operators, they do not need to send staff to the device site for diagnosis, thus reducing labor costs of the operators.

It can be understood by those having ordinary skills in the art that the above-mentioned various embodiments are specific embodiments for implementing the present disclosure, and in practical application, various changes may be made to the embodiments in form and details without departing from the protection scope of the present disclosure. Anyone having ordinary skills in the art can make their own changes and modifications without departing from the protection scope of the present disclosure, so the protection scope of the present disclosure is defined by the claims.

The invention claimed is:

1. A log acquisition method applicable to a terminal device, comprising:
receiving a log acquisition instruction sent by a server;
establishing a data stream path with the server in response to the log acquisition instruction; and
collecting real-time log data of the terminal device, and sending the real-time log data to the server through the data stream path;
wherein prior to receiving the log acquisition instruction sent by the server, receiving a log function enabling request sent by the server, and establishing a control channel with the server based on a Transmission Control Protocol (TCP); and
wherein receiving the log acquisition instruction sent by the server comprises receiving the log acquisition instruction through the control channel.

2. The log acquisition method of claim 1, wherein the log acquisition instruction comprises at least one of a system log acquisition instruction or a modem log acquisition instruction, wherein:
in response to the log acquisition instruction comprising the system log acquisition instruction, the real-time log data comprises real-time system log data; and
in response to the log acquisition instruction comprising the modem log acquisition instruction, the real-time log data comprises real-time modem log data.

3. The log acquisition method of claim 1, wherein the log function enabling request contains a key; and the method further comprises:
prior to establishing the control channel with the server based on the TCP, verifying that an identity of the server is legal based on the key.

4. The log acquisition method of claim 1, wherein the log acquisition instruction comprises a historical log acquisition instruction, and the log acquisition method further comprises:
acquiring historical log data from a local storage unit; and
sending the historical log data to the server through the control channel.

5. The log acquisition method of claim 1, wherein establishing the data stream path with the server comprises:
establishing the data stream path based on a socket mechanism.

6. A terminal device, comprising:
at least one processor; and
a memory communicatively connected to the at least one processor, wherein:
the memory stores instructions executable by the at least one processor which, when executed by the at least one processor, cause the at least one processor to perform the log acquisition method of claim 1.

7. A non-transitory computer readable storage medium storing a computer program which, when executed by a processor, causes the processor to perform the log acquisition method of claim 1.

8. A log acquisition method applicable to a server, comprising:
sending a log acquisition instruction to a terminal device;
establishing a data stream path with the terminal device in response to a data stream path establishment request initiated by the terminal device based on the log acquisition instruction;
receiving real-time log data sent by the terminal device through the data stream path;
wherein prior to sending the log acquisition instruction to the terminal device, sending a log function enabling request to the terminal device, wherein the log function enabling request contains a key for the terminal device to verify an identity of the server;
establishing a control channel with the terminal device after receiving acknowledgement information fed back by the terminal device, wherein the acknowledgement information is sent by the terminal device after verifying that the identity of the server is legal based on the key; and
wherein sending the log acquisition instruction to the terminal device comprises sending the log acquisition instruction to the terminal device through the control channel.

9. A server, comprising:
at least one processor; and
a memory communicatively connected to the at least one processor, wherein:
the memory stores instructions executable by the at least one processor which, when executed by the at least one processor, cause the at least one processor to perform the log acquisition method of claim 8.

10. A non-transitory computer readable storage medium storing a computer program which, when executed by a processor, causes the processor to perform the log acquisition method of claim 8.

11. A log acquisition apparatus built in a terminal device, comprising:
a master control communication module configured to receive a log acquisition instruction sent by a server, and establish a data stream path with the server in response to the log acquisition instruction; and
a log acquisition module configured to collect real-time log data of the terminal device, and send the real-time log data to the server through the data stream path;
wherein the log acquisition module further comprises a system log module and a modem log module;

wherein the system log acquisition module is configured to collect real-time system log data of the terminal device in response to the log acquisition instruction comprising a system log acquisition instruction, and send the real-time system log data to the server through the data stream path; and wherein the modem log module is configured to collect real-time modem log data of the terminal device in response to the log acquisition instruction comprising a modem log acquisition instruction, and send the real-time modem log data to the server through the data stream path.

12. The log acquisition apparatus of claim 11, further comprising:
a local storage unit configured to store historical log data of the terminal device;
wherein the master control communication module is further configured to collect the historical log data from the local storage unit and send the historical log data to the server through a control channel in response to the log acquisition instruction comprising a historical log acquisition instruction.

13. The log acquisition apparatus of claim 11, further comprising:
an enabling module configured to receive a log function enabling request sent by the server, wherein the log function enabling request contains a key, and legality of an identity of the server is verified based on the key; and the enabling module is further configured to notify the master communication module to establish a control channel with the server after an identity verification result of the server is legal.

* * * * *